US012460446B2

(12) United States Patent
Maccuish et al.

(10) Patent No.: US 12,460,446 B2
(45) Date of Patent: Nov. 4, 2025

(54) METHOD AND A HOUSING FOR STORING AND CONTROLLABLY RELEASING A PRODUCT

(71) Applicant: MODEREAT LTD, Glasgow (GB)

(72) Inventors: Christine Anne Maccuish, Glasgow (GB); Ahmed Nisham, Glasgow (GB)

(73) Assignee: MODEREAT LTD, Glasgow (GB)

( * ) Notice: Subject to any disclaimer, the term of this patent is extended or adjusted under 35 U.S.C. 154(b) by 72 days.

(21) Appl. No.: 18/264,553

(22) PCT Filed: Feb. 9, 2022

(86) PCT No.: PCT/GB2022/050353
§ 371 (c)(1),
(2) Date: Aug. 7, 2023

(87) PCT Pub. No.: WO2022/172008
PCT Pub. Date: Aug. 18, 2022

(65) Prior Publication Data
US 2024/0044173 A1 Feb. 8, 2024

(30) Foreign Application Priority Data
Feb. 9, 2021 (GB) ...................... 2101769

(51) Int. Cl.
*E05B 43/00* (2006.01)
*E05B 47/00* (2006.01)
(Continued)

(52) U.S. Cl.
CPC ........ *E05B 43/005* (2013.01); *E05B 47/0012* (2013.01); *G16H 20/00* (2018.01); *G16H 50/20* (2018.01)

(58) Field of Classification Search
CPC ........ E05B 43/00; E05B 43/005; E05B 47/00; E05B 47/0012; E05B 47/0013; G16H 20/00; G16H 50/20
(Continued)

(56) References Cited

U.S. PATENT DOCUMENTS 4,621,746 A * 11/1986 Reichle .................. G07F 11/54
101/223
5,787,819 A * 8/1998 Fumanelli ............. E05B 43/005
109/31
(Continued)

FOREIGN PATENT DOCUMENTS

CN 111063108 A * 4/2020
EP 3029642 A1 8/2016
(Continued)

OTHER PUBLICATIONS

Search Report in counterpart United Kingdom Patent Application No. GB2201867.7, mailed Jul. 7, 2022.
(Continued)

*Primary Examiner* — Nathan Cumar
(74) *Attorney, Agent, or Firm* — Kim IP Law Group LLC

(57) ABSTRACT

Aspects of the invention relate to a method of controllably releasing a product to a user from a housing. The housing comprises at least one compartment, and an access opening for accessing the compartment, the access opening having a locked state and an unlocked state. The method comprises locking the access opening to the container to prevent access to the product; monitoring a measurable parameter, and comparing the measurable parameter with a threshold value; determining whether to unlock the access opening by determining whether the monitored measurable parameter meets the threshold value; and either in response to determining that the access opening should be unlocked, unlocking the access opening allowing the user to access the product
(Continued)

located within the compartment; or in response to determining that the access opening should not be unlocked, keeping the access opening locked, preventing the user from accessing the product located within the compartment.

22 Claims, 14 Drawing Sheets

(51) Int. Cl.
    *G16H 20/00*     (2018.01)
    *G16H 50/20*     (2018.01)

(58) Field of Classification Search
    USPC .......................................................... 70/271
    See application file for complete search history.

(56) References Cited

U.S. PATENT DOCUMENTS

| | | | | |
|---|---|---|---|---|
| 8,238,876 B2* | 8/2012 | Teng | ........................ | H04M 1/67 |
| | | | | 455/566 |
| 9,743,781 B2* | 8/2017 | Alshammari | .............. | A47F 1/04 |
| 2009/0249247 A1* | 10/2009 | Tseng | ..................... | H04W 4/50 |
| | | | | 715/835 |

FOREIGN PATENT DOCUMENTS

| | | | |
|---|---|---|---|
| JP | 2010157059 A | 7/2010 | |
| WO | 2010033197 A1 | 3/2010 | |
| WO | WO-2013180992 A1 * | 12/2013 | ......... G06F 19/3406 |

OTHER PUBLICATIONS

International Search Report in International Patent Application No. PCT/GB2022/050353, mailed May 6, 2022.

Written Opinion in International Patent Application No. PCT/GB2022/050353, mailed May 6, 2022.

United Kingdom Intellectual Property Office, Examination Report in counterpart United Kingdom Patent Application No. GB2201687.7, mailed on Sep. 13, 2024.

United Kingdom Intellectual Property Office, Examination Report in counterpart United Kingdom Patent Application No. GB2201687.7, mailed on Apr. 12, 2024.

* cited by examiner

Figure 17                                    Figure 18

METHOD AND A HOUSING FOR STORING AND CONTROLLABLY RELEASING A PRODUCT

CROSS-REFERENCE TO RELATED APPLICATION(S)

This is a national stage application filed under 35 U.S.C. § 371 based on International Patent Application No. PCT/GB2022/050353, filed Feb. 9, 2022, which claims priority to United Kingdom Patent Application No. GB2101769.4, filed Feb. 9, 2021, the disclosures of which are incorporated herein by reference in their entireties for all purposes.

TECHNICAL FIELD

The present disclosure relates to a housing for storing and controllably releasing a product, particularly, but not exclusively, to a housing comprising rotatable compartments for storing and controllably releasing a food product such as a snack or drink to a user. Aspects of the invention relate to a housing for storing and controllably releasing a product, to a system for storing and controllably releasing a product to a user and to a method of controllably releasing a product to a user from a housing.

BACKGROUND

Obesity is a major problem in the UK, with over 28.7% of the population being classified as obese (BMI over 30) according to a 2017 NHS Health Survey. The major problem with obesity from a health point of view is that it is associated with reduced quality of life and reduced life expectancy. Furthermore, obesity has a serious impact on economic development, with current estimates suggesting the overall cost of obesity to wider society in the UK is £27 billion, with this set to increase to £50 billion by 2050.

Obesity develops over a long period of time and is usually caused by poor dietary and lifestyle choices. Diet can have an especially expeditious effect on obesity, with most studies accepting that diet is the main factor leading to obesity. One of the major problems people find when dieting is cravings and snacking. This is especially the case with the current trend towards long-term working from home where people have easier access to snacks and increased temptations around the home. Exercise also plays a key role in reducing obesity, with increased activity being linked to reductions in obesity.

Food cravings are extremely common in people who are partaking in diets, with over 90% of people experiencing them. The most common types of foods that are craved for are 'unhealthy' foods that are high in sugar, unhealthy fats and salt. Cravings can stem from a multitude of places such as seeing a food in an advert, hormonal fluctuations within the body, and comfort eating due to stress. For these reasons, cravings can often be very hard to control.

U.S. Pat. No. 9,199,772 describes a time-lockable single unit storage container which is designed for locking away items, such as snacks, for a set period of time. The device described seeks to prevent an individual from accessing the locked away items. However, once the lid is unlocked at the expiry of the set period of time, the individual may gain access to the entire contents of the storage container. This is undesirable as an individual with cravings over the course of a day may consume the entire contents of the container as a result of uncontrollable cravings.

US 20070251800 describes a personal snack dispenser that allows for storage of several snacks and can be accessed by inserting money. The personal snack dispenser allows a person to lock away several snacks into different compartments simultaneously. However, it does not address the problem of controlling an individual's cravings as the individual can still access all the snacks if they so wish to by inserting the correct amount of money.

These devices seek to solve the problem of locking away items of food so that they can not be accessed by an individual. However, they do not solve the problem of controlling cravings related to food that can occur at different times of the day. Furthermore, storing snacks in a singular compartment only solves the problem of one individual instance of a craving and if multiple snacks are stored within the container the individual may binge on the food contained within the container. Additionally, the device described in US 20070251800 which dispenses food in exchange for money does not stop the individual from accessing the food when they have uncontrollable cravings.

There is therefore a requirement for a system that can effectively control the cravings that people who are dieting can experience over the course of a day and week. It is an aim of the present invention to address one or more of the disadvantages with the prior art.

SUMMARY OF THE INVENTION

According to a first aspect of the present invention there is provided a housing for storing and controllably releasing a product, for example a snack, a beverage or medication, to a user, the housing comprising: an open-topped container comprising a cavity within the container wherein the product is positioned within the cavity; and a lid positioned over the open top of the container, the lid being lockable to the container to prevent access to the product via the open top of the container when the lid is locked; wherein the container further comprises an access opening on a side wall of the container and a door is positioned over the access opening, the door being moveable between a closed position in which the door prevents access to the cavity and an open position in which the user may access the product contained within the cavity.

According to a second aspect of the present invention there is provided a housing for storing and controllably releasing a product to a user, the housing comprising: a container comprising a compartment within the container wherein the product is positioned within the compartment; wherein the container further comprises an access opening on a side wall of the container and a door is positioned over the access opening, the door being moveable between a closed position in which the door prevents access to the container and an open position in which the user may access the product contained within the container.

Optional features of embodiments according to the first and/or second aspects are described below. Advantageously, a user of the housing may place multiple products within the housing via the or a open top of the container before locking the or a lid to the container thereby preventing access to the contents of the container via the open top of the container. The user may gain access to the contents of the container via the access opening on the side wall of the container. The door over the access opening may be operable as to only allow the user access to the products when a measurable parameter meets a threshold value. Where the measurable parameter is time, the threshold value may be a pre-set time window. Alternatively or additionally, the measurable parameter may be a parameter relating to the user; it can be a monitored activity level of a user, preferably a step count of a user; or an input from the user confirming that they have completed an activity; or a calorie count of a user.

As such, the housing prevents a user from binge eating or succumbing to cravings by only allowing the user access to the products at a pre-determined time or in response to the user being particularly active thereby rewarding the user.

In an embodiment the cavity may comprise a plurality of dividing walls. A series of compartments for storing products may be defined between adjacent dividing walls. The dividing walls may be coupled to and extend radially from a support member towards an internal surface of the container. The dividing walls may beneficially prevent the user from accessing multiple compartments via the access opening. For example, when the door to the access opening is in the open position the user may only access the product contained within the compartment aligned with the access opening. The dividing walls may inhibit access to adjacent compartments via the access opening. As such, access to a single compartment on a given day may be provided.

In one embodiment the support member may be mounted on a rotation mechanism for rotating the support member. Rotating the support member may rotate the dividing walls to control the position of the compartments within the container. For example, the support member may be rotated every day so as to align a compartment corresponding to a given day of the week with the access opening. As such, a user may position a product they intend to consume on a given day in the corresponding compartment at the start of the week before locking the lid to the container. Access may then be provided to the compartment, and thus product, corresponding to that day of the week by rotating the support member and thus dividing walls so as to align the compartment with the access opening.

In one embodiment the support member may be an elongate shaft extending upwardly from a centre point on a base of the container. The elongate shaft may be mounted on a spindle connected to a rotation mechanism. Furthermore, a tray or lower shelf may be connected to the support member. The tray may provide a surface within each compartment that a product may be placed. The tray may be connected to the support member such that the tray may be rotated by the support member.

In an embodiment each dividing wall may be spaced evenly around the support member such that the compartments defined between adjacent dividing walls are substantially equal size. The dividing walls may be equally spaced circumferentially around the support member.

In another embodiment a shelf may be positioned within the cavity such that each compartment comprises a lower portion located under the shelf and an upper portion located above the shelf. This is beneficial as a user may place a product intended for consumption in the morning of a given day in the lower portion of each compartment and further place a product they intend to consume in the afternoon in the upper portion of each compartment. This also beneficially allows two different users to simultaneously store two separate products within the housing.

The shelf may be coupled to an outer support sleeve. The outer support sleeve may be positioned over the support member such that the support member is at least partially received within a passage of the outer support sleeve. As such, the shelf may be fitted to the container by sliding the outer sleeve over the support member and subsequently removed from the container by lifting the outer support sleeve upwardly off the support member. The shelf may be planar and the slidably removable outer support sleeve may extend upwardly from the centre of the shelf such that the passage extends through the shelf and the outer support sleeve. The shelf may be formed of component parts. The shelf, or one or more component parts of a multi part shelf may rest on a shelf support. The shelf, or one or more component parts of a multi part shelf may be fixed in position so that a user cannot remove the shelf or a component part of a shelf through the access opening. A range of shelf supports may be provided so that a user can customise the height that the shelf, or a component part of the shelf, rests at. The component parts of a multi part shelf may be provided at a range of different heights. The shelf may have gaps in it, in order that some compartments have a shelf (or a component part of a shelf) in them, and therefore an upper portion and a lower portion that can be accessed at different times, and other components do not have any part of the shelf within them. This allows a combination of single height and double height compartments.

Furthermore, the outer support sleeve may comprise a cap at a distal end of the support sleeve extending over the passage such that, in use, the cap abuts a top surface of the support member to support the shelf within the cavity. This is beneficial as the outer support sleeve may be slid over the support member and the cap on the outer support sleeve may rest on the top of the support member thereby suspending the shelf within the contained. The shelf may comprise elongate slots extending radially outwardly from the outer support sleeve towards an outer edge of the shelf for receiving the dividing walls. This is beneficial as the slots may engage the dividing walls such that rotating the dividing walls also causes the shelf to be rotated.

In an embodiment the door may comprise a lower door and an upper door. The lower door may be aligned with the lower portion of the compartment and the upper door may be aligned with the upper portion of the compartment such that opening the lower door and/or the upper door provides the user access to the lower portion and/or upper portion of the compartment respectively. This is beneficial as opening the lower door or upper door ensures that the user of the housing may only access a single portion of the compartment at a time. For example, the lower door may open to allow the user to gain access to a product in the lower portion of the compartment corresponding to a product to be consumed in the morning. Later in the day the upper door may be opened to allow the user to gain access to the product positioned within the upper portion of the compartment. Alternatively, the lower portion of the compartment may be used to store a product to be consumed in the afternoon or evening, and the upper portion of the compartment may be used to store a product to be consumed in the morning. The housing may be provided with further internal barriers in order to prevent products placed in the compartments contacting the doors during rotation of the dividing walls. This may prevent products from jamming the rotation of the dividing walls.

In another embodiment the shelf, or parts of a multi part shelf, may be removed creating singular compartments that correspond to each day of the week. The upper and lower doors may be operated so as to open together giving the user access to the entirety of the compartment. For example, the user may only want to store one product per day or may want to store a larger product. This beneficially gives the user flexibility over the size of product they want to store within the housing. Furthermore, it may allow a user to store a beverage bottle within a compartment.

In one embodiment the housing may comprise five dividing walls and five compartments defined between the dividing walls or seven dividing walls and seven compartments defined between the dividing walls. This is beneficial as each compartment may correspond to a day of the week and a user may place a product they intend to consume on a given day in the respective compartment at the start of the week or working week. The day of the week may be transcribed onto the base and/or shelf of each compartment to help the user organise their products for the week. The day of the week may further be transcribed on the dividing walls of the container. This is beneficial as it allows a user to easily associate a compartment with a day of the week such that the user can plan the products they intend to consume over the course of a week.

In another embodiment the housing may comprise a speaker configured to output a notification to the user in response to the user attempting to unlock the lid of the housing. This is beneficial as the user may output a notification or command to the user to check that they are certain that they wish to unlock the access door. The speaker may further notify the user when the battery is running low to prompt the user to recharge the housing. The housing may further comprise a microphone such that the user has to vocalise to the housing that they wish to positively unlock the access door. The act of asking the housing to unlock itself may help to prevent the user succumbing to cravings. The microphone may be further configured to the speaker creating a smart speaker that can give audible feedback to the user when they communicate with the housing. Alternatively, the lid may be permanently locked for the duration of the week to ensure the user does not succumb to their cravings. The lid may be automatically unlocked at the end of the week.

According to a third aspect of the present invention there is provided a system for storing and controllably releasing a product to a user, the system comprising: a according to the first or second aspects of the invention; and a device for monitoring one or more measurable parameters of the user; wherein the system further comprises a control module configured to compare the or each measurable parameter with a respective threshold value; the control module being further configured to unlock the door of the housing to give the user access to the product within the container in response to the control module determining that the, or each, or a predetermined combination of measurable parameter(s) of the user meet their respective thresholds.

Advantageously, the system may incentivise a user to be active or to exercise by rewarding the user with a product upon meeting a pre-determined activity level. For example, the activity level may be a number of steps, a time spent exercising such as cycling, running or yoga or a distance walked. When the control module determines that the user has met their activity level target they may be rewarded by being given access to a product within the container. The activity tracker may be a mobile phone, a smart watch or any other device configured to monitor the exercise, activity or movement of a user.

In an embodiment the system may comprise a mobile communication device and the lid may be configured to be locked or unlocked by the mobile communication device. The skilled reader will understand that the mobile communication device may, for example, be a mobile phone, a tablet, a desktop computer, a smart watch, a laptop or a smart speaker.

According to a fourth aspect of the present invention there is provided a method of controllably releasing a product to a user from a housing in dependence on the user's activity level, the housing comprising at least one compartment within an open-topped container and a lid positioned over the open top of the container, the method comprising: locking the lid to the open-topped container to prevent access to the product via the open top of the container; monitoring the activity level of the user; comparing the activity level of the user with a threshold activity level; and providing access to the product located within the compartment in response to determining that the monitored activity level of the user meets the threshold activity level. In an embodiment providing access to the product may comprise opening a door positioned over an access opening on a side wall of the container. The method may comprise determining a door to open in dependence on the time of day. For example, the method may comprise determining to open a lower door in the morning and an upper door in the afternoon. Alternatively, the door opening order may be reversed with the lower door being opened in the afternoon and the upper door being opened in the morning.

In one embodiment providing access to the product may comprise rotating the compartment within the container to align the compartment with the access opening. The method may comprise rotating the compartment within the container to align a compartment corresponding to a day of the week with the access opening in dependence on the day of the week. For example, the method may comprise determining the day of the week and rotating a compartment corresponding to said day of the week to align the compartment with the access opening.

In another embodiment the method may comprise outputting a notification to the user in response to the user attempting to gain access to the product when the threshold activity level has not been met to deter the user. The notification may be an audio command output from a speaker to the user. In another embodiment the lid may not be unlocked by the user until the end of the week or without contacting a customer helpline to deter the user. The user may contact the customer helpline by talking to a chatbot via a smart speaker within the housing or the user may call the customer helpline and talk to an operator to unlock the lid.

In an embodiment the method may comprise comparing the time, for example the time of day, with an allowable consumption time window and providing access to the snack when both the time is within an allowable consumption time window and the user's activity level meets the threshold activity level. This is beneficial as the method may ensure that the snacks are provided to the user when the user intends to consume then. For example, a user may go for a walk before starting work which causes the threshold activity level to be satisfied but access to the snack will not be provided until the consumption window has commenced. The consumption window may be mid-morning or mid-afternoon. The skilled reader will understand that the consumption window is optional and the opening of the doors may simply be triggered by the threshold activity level being satisfied.

According to a fifth aspect of the present invention there is provided a method of controllably releasing a product to a user from a housing, the housing comprising; at least one compartment, and an access opening for accessing the compartment, the access opening having a locked state and an unlocked state, and the method comprising: locking the access opening to the container to prevent access to the product; monitoring a measurable parameter, and comparing the measurable parameter with a threshold value; determining whether to unlock the access opening by determining whether the monitored measurable parameter meets the threshold value; and either
    (a) in response to determining that the access opening should be unlocked, unlocking the access opening allowing the user to access the product located within the compartment; or
    (b) in response to determining that the access opening should not be unlocked, keeping the access opening locked, continuing to prevent the user from accessing the product located within the compartment.

Optional features of embodiments according to the fourth and/or fifth aspects are described below.

Optionally the measurable parameter is one of: time; or a monitored activity level of a user, preferably a step count of a user; or an input from the user confirming that they have completed an activity; or a calorie count of a user.

Optionally more than one measurable parameter is measured and compared to a threshold value.

Optionally the step of determining whether to unlock the access opening further comprises determining whether each monitored measurable parameter meets their respective threshold value, and determining that the access opening should be unlocked if and only if each monitored measurable parameter meets their respective threshold value.

Optionally the step of determining whether to unlock the access opening further comprises determining whether some, but not all, of the monitored measurable parameters meet their respective threshold value, and determining that the access opening should be unlocked if a predetermined combination of monitored measurable parameters meet their respective threshold value.

Optionally method further comprises outputting a notification to the user in response to the user attempting to gain access to the product when the access opening is in its locked state, to deter the user.

Optionally the method further comprises: providing software for use on a mobile communication device, the software being configured to communicate with the housing.

Optionally the method has a set-up step in which the user provides user information to the software.

Optionally the method further comprises the software gathering additional user information via the user's interactions with the housing and/or with the mobile communication device.

Optionally the method further comprises: the software using the user information and/or the additional user information to predict a habit of the user, preferably by machine learning.

Optionally the method further comprises outputting a notification to the user at a notification time when the housing is in its locked state, to deter the user, the notification preferably being either an audio command output from a speaker to the user, or a notification provided on the mobile communication device.

Optionally the method comprising determining what time to send a notification and/or what type of notification to send by using the prediction of the user's habits and/or by using the user information provided by the user.

Optionally the method comprises a sub step in which at least one threshold value may be adjusted in response to the prediction of the user's habits and/or by using the user information provided by the user.

Optionally the user is given the choice to adjust one of more of the threshold values, and if the user chooses to adjust the threshold value, the user experiences a pre-set penalty.

Optionally providing access to the product comprises rotating the compartment within the container to align the compartment with the access opening.

Optionally the product is one or more of: any single use and/or consumable item, including but not limited to: a snack; a drink, including alcoholic drinks; a pharmaceutical; a product related to vaping and/or smoking.

Further features and advantages of the first, second, third, fourth and fifth aspects of the present disclosure will become apparent from the claims and the following description.

BRIEF DESCRIPTION OF DRAWINGS

Embodiments of the present disclosure will now be described by way of example only, with reference to the following diagrams, in which:—

FIGS. 15-18 show examples of a user interface.

DETAILED DESCRIPTION

Figure 1:
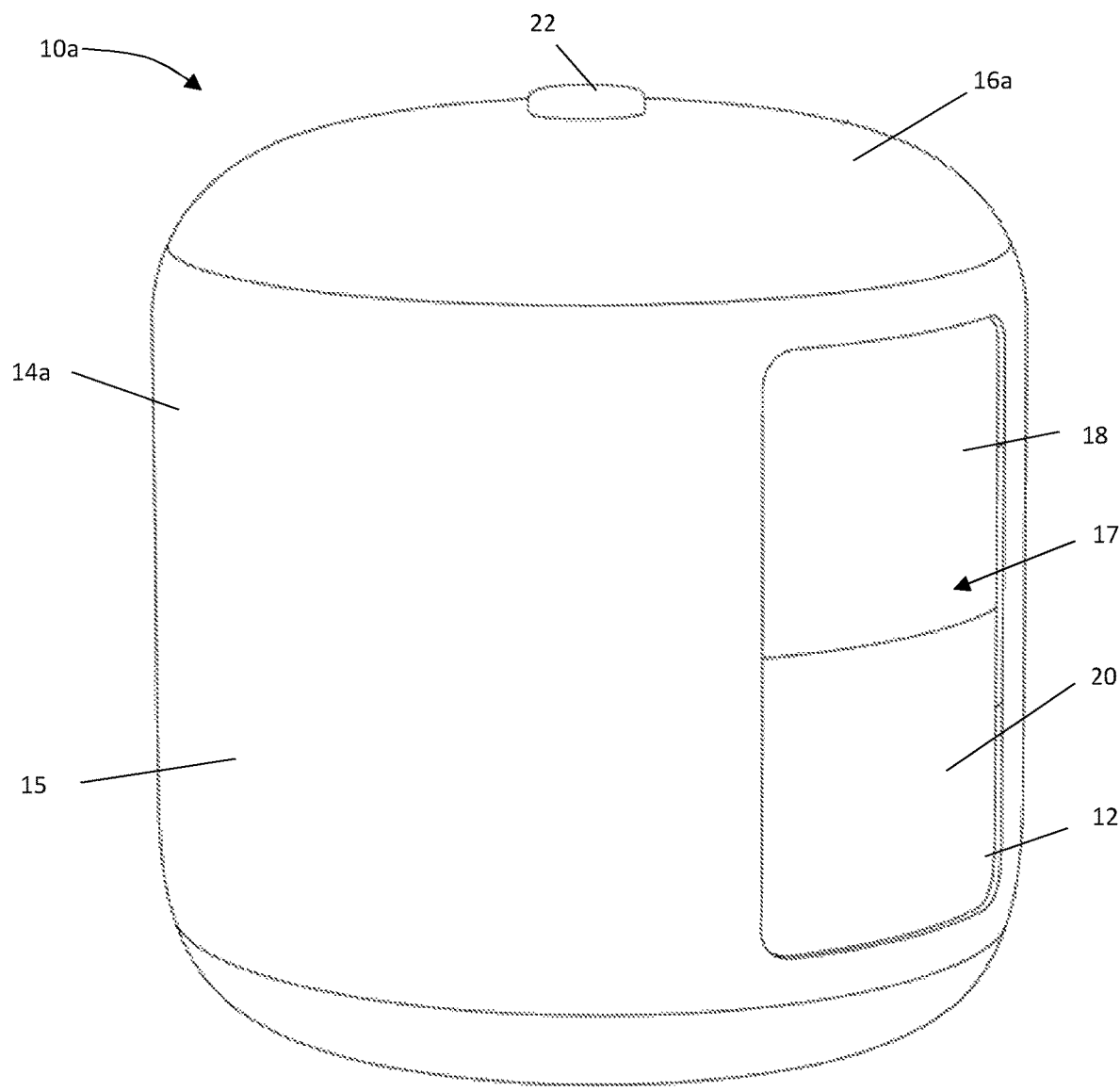
FIG. 1 is a perspective view of a housing for storing and controllably releasing a snack according to an embodiment of the invention according to the first or the second aspects of the present invention.

In general terms embodiments of the invention relate to a housing for storing and controllably releasing a product, for example a snack, to a user. The housing comprises a plurality of compartments within which a user may place a number of snacks that they intend to consume over the course of a week. When the user positions the snacks within the housing, the housing is locked to prevent the user from accessing all of the snacks within the housing at once. The housing may control access to each of the compartments that contain a snack such that the user may only consume, for example, one snack per day. Furthermore, the housing may connect to a mobile communication device capable of monitoring the activity of the user such that the housing may only provide access to the snacks contained within the housing in dependence on the user satisfying an activity level over a given time period. Alternatively, the housing and or the mobile communication device may monitor the time of day such that the housing may only provide access to the snacks contained within the housing in dependence on the time of day.

The housing beneficially provides a storage system for snacks which controls the release of the snacks to the user such that the housing may help an individual control their cravings throughout the day. By locking away several different snacks into separate compartments within the housing, the user can only access one snack at a time thereby preventing the user from binging on multiple snacks contained within the housing in one sitting. Furthermore, the housing may motivate a user to exercise by only granting the user access to the snacks within the housing upon satisfying a pre-determined activity level for a day. For example, the housing may only provide access to a snack if the user walks 5,000 steps over the course of a morning.

To place embodiments of the invention in a suitable context reference will now be made to FIG. 1 which shows a perspective view of a housing 10a for storing and controllably releasing a snack to a user, and to FIG. 11, which shows a perspective view of an alternative housing 10b for storing and controllably releasing a snack to a user. Housings 10a and 10b are similar. Like features in the housings 10a and 10b are given identical reference numerals and operate identically, and where there are differences in the features of housings 10a and 10b, these are denoted by the suffix a or b after the reference numeral. The housing 10a, 10b may be placed on a surface (not shown), for example, a user's desk such that the user may store multiple snacks within the housing 10a, 10b. The housing 10a, 10b comprises a hollow container 14a, 14b for storing the snacks and housing 10a comprises a lid 16a for sealing the container 14a. The lid 16a may be secured to the top of the container 14a to form the housing 10a. The lid 16a is secured to the top of the container 14a such that the contents of the container 14a are locked from a user. The lid 16a is lockable such that after a user loads the housing 10a with snacks the lid 16a prevents unwanted access to the contents of the housing 10a.

Figure 11:
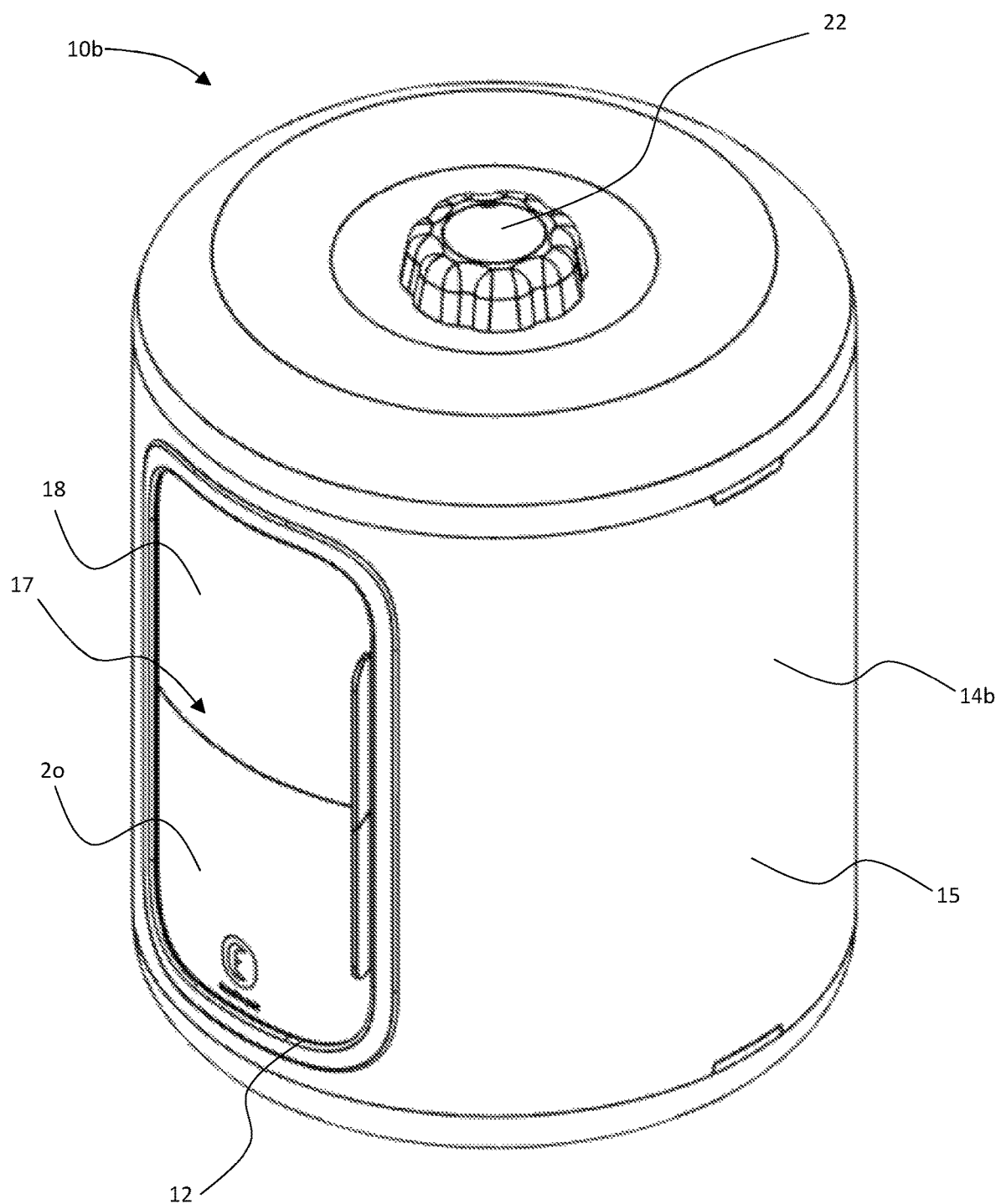
FIG. 11 is a perspective view of an alternative embodiment of a container according to the second aspect of the present invention.

As shown in FIG. 1 and FIG. 11, the container 14a, 14b comprises an aperture 12 positioned on a side wall 11 of the container 14a, 14b for accessing the interior cavity of the container 14a, 14b. The hollow container 14a, 14b further comprises a door 17 extending over the aperture 12. The door 17 is operable between a closed position (as shown in FIG. 1 and FIG. 11) in which the door 17 seals the aperture 12 and an open position in which a user may access the contents of the container 14a, 14b via the aperture 12. The door 17 comprises a lower door 20 and an upper door 18 which may be actuated between the open and closed or locked and unlocked positions in unison or independently from each other.

Figure 2:
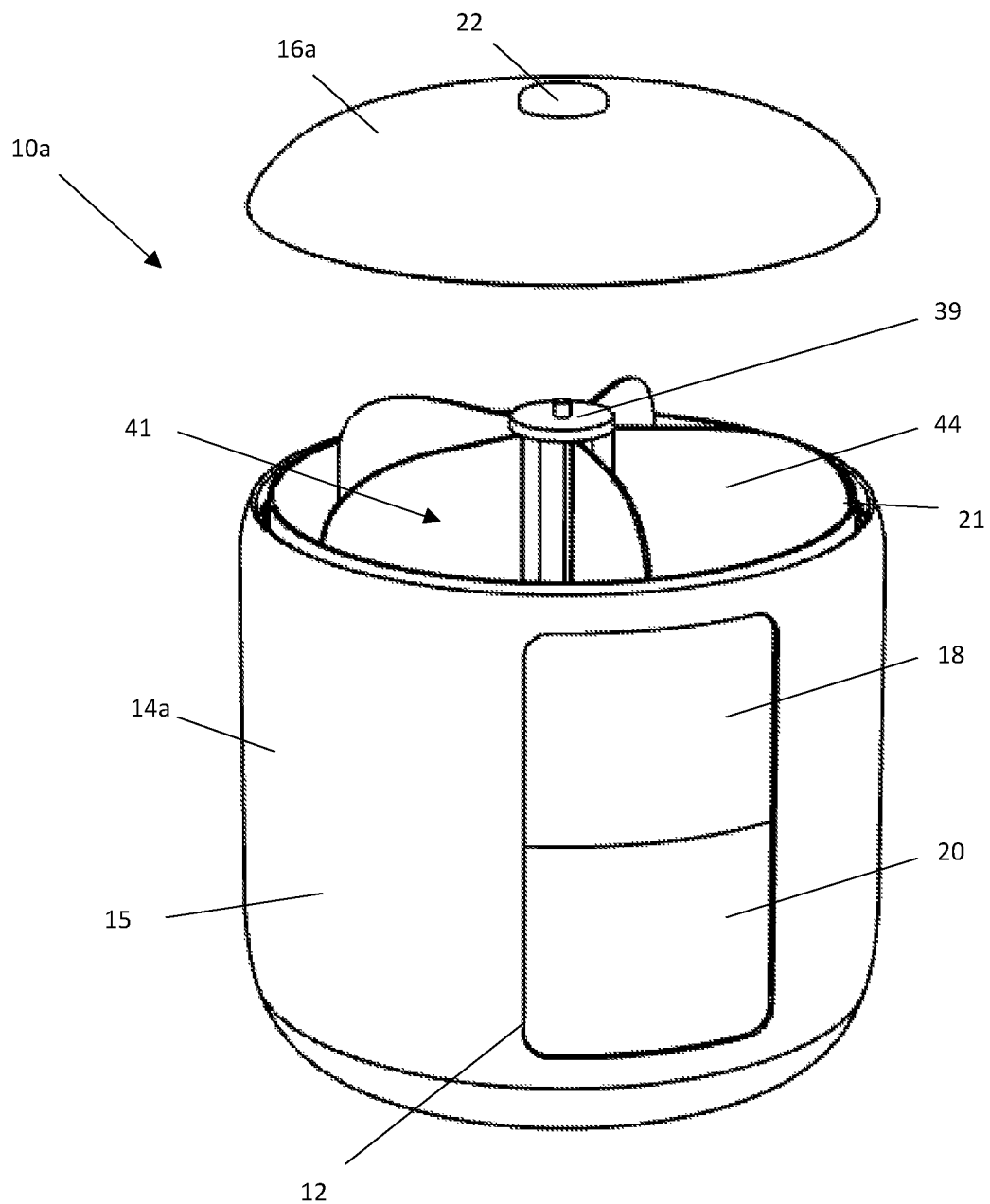
FIG. 2 is a perspective view of the housing of FIG. 1 with the lid removed.

Turning now to FIG. 2, there is shown a perspective view of the housing 10a with the lid 16 removed. As can be seen in FIG. 2, the container 14a is an open-topped, cylindrical container 14a into which a plurality of snacks may be placed. The cylindrical container 14a comprises an access opening 21 on the top through which a user may load the container 14a with snacks. When the lid 16 is secured to the container 14a the access opening 21 is sealed by the lid 16a.

The container 14a, 14b is divided into five compartments 41 for storing a plurality of snacks within each compartment 41. Each compartment 41 may correspond to a day of a typical five-day working week such that the user may place the snacks they intend to consume each day within the respective compartment 41. Each compartment 41 is defined between two adjacent compartment dividing walls 44 or paddles. The day of the week may be written within the compartments 41 such that a user of the housing 10 may easily identify which day of the week each compartment 41 corresponds to.

Each dividing wall 44 extends radially from a support member 39, positioned in the centre of the container 14, towards the side wall 15 of the container 14. The support member 39 is configured to be rotated so as to control the position of each dividing wall and thus compartment 41 within the housing 14. For example, the support member 39 may be rotated to align a compartment 41 with the aperture 12 on a given day. This is beneficial as a user may load each compartment 41 with the snacks required for each day of their working week on the morning of their first day of work via the access opening 21 before locking the container 14 with the lid 16. The user may then only access a single compartment 41 a day via the aperture 12 on the side wall 15 of the container 14 as the compartment dividing walls 44 inhibit access to more than one compartment 41 a day unless the support member 39 rotates the compartments 41 to align a new compartment 41 with the aperture 12.

Figure 3:
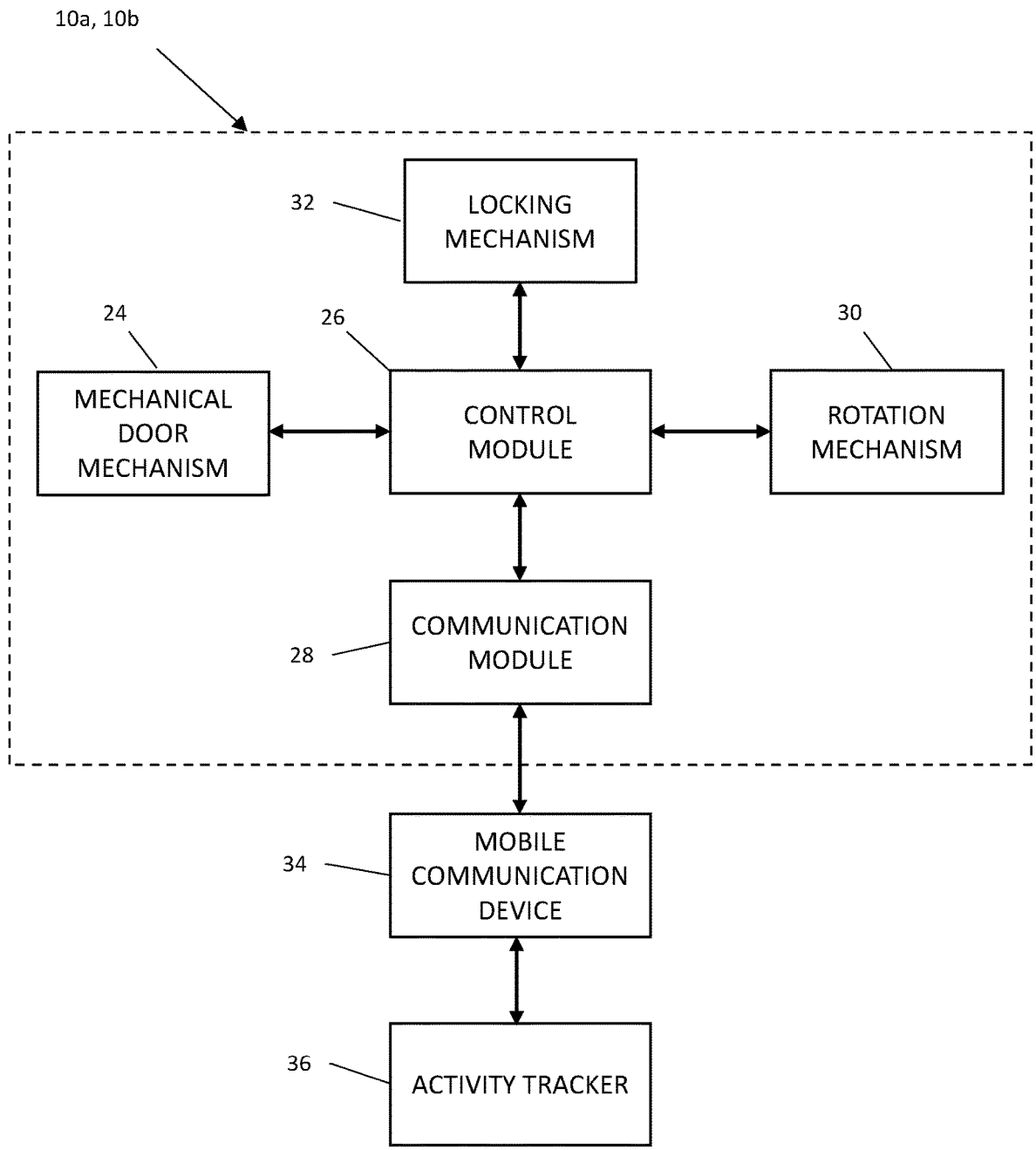
FIG. 3 is a schematic block diagram of a system for controllably releasing a snack from the housing of FIG. 1 in dependence on an activity level of a user.

Turning now to FIG. 3 there is shown a block diagram of components found within the housing 10a, 10b. The housing 10a, 10b comprises a rotation mechanism 30 coupled to the support member 39 for rotating the support member 30 and thus controlling the position of the compartments 41 within the container 14 a, 14b. The rotating mechanism 30 may be a stepper motor or the like for controlling the rotational position of the compartments 41. The rotating mechanism may alternatively be hand powered, preferably by the user. The rotating mechanism may comprise a spindle which the support member may be connected to so as to allow the support member 39 to be rotated. The compartments 41 may be rotated by the rotating mechanism 30 to line up with the aperture 12 on the side wall 15 of the container 14 a, 14b so as to control which compartment 41 the user may access on a given day. The rotation mechanism is controlled via the control module 26 or processor. If a hand powered rotating mechanism was used, the control module could simply release a brake, thus allowing the rotating mechanism to be rotated by the user.

The housing 10 a further comprises a locking mechanism 32 for locking the lid 16a to the container 14a once a user has loaded snacks into the respective compartments 41 via the access opening 21. The locking mechanism 32 is configured to lock the lid 16a to the container 14a to seal the access opening 21 thereby preventing a user accessing multiple compartments on a single day. The locking mechanism 32 is controlled via the control module 26 so as to only provide access to the interior cavity of the container via the lid 16a when the container 14a is empty and needs to be refilled with snacks. Typically, a user would load the container 14a with snacks at the start of the week and the lid 16a would remain locked to the container 14a until the end of the week when all of the snacks have been consumed.

Figure 9:
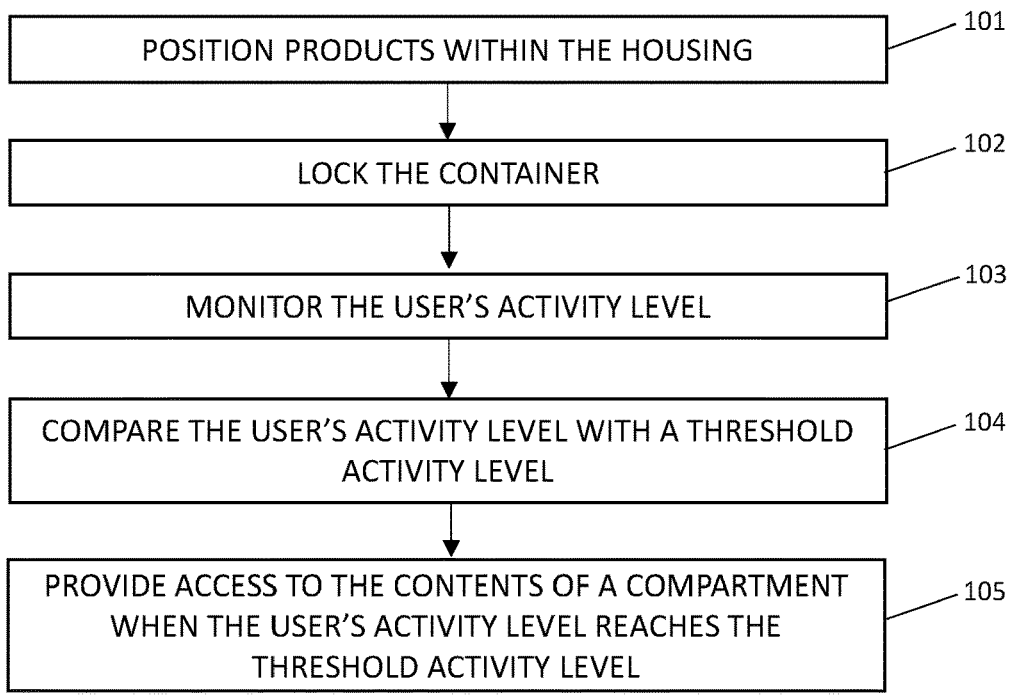
FIG. 9 is a flow chart outlining a method of releasing a snack to a user in dependence on the user's activity level.
Figure 10:
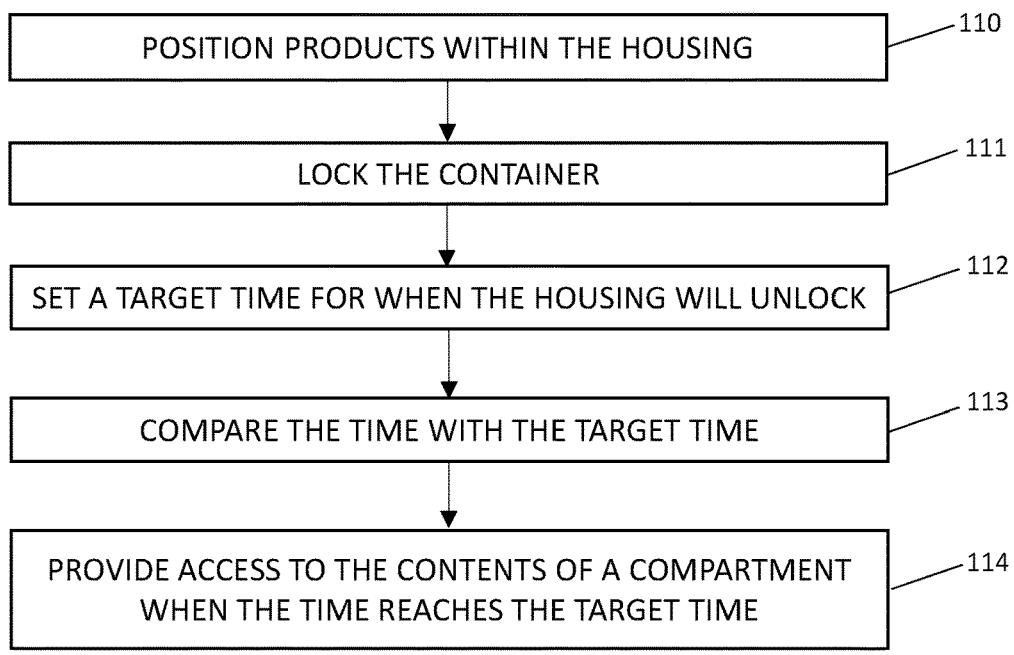
FIG. 10 is a flow chart outline a method of releasing a snack to a user in dependence on a time of day.

The housing 10b in FIGS. 9-11 does not have a removeable lid. Housing 10b can be loaded with snacks by the user inserting snacks through the door(s) 17, 18, 20.

The housing 10a, 10b further comprises a mechanical door mechanism 24 which opens and closes the door 17. The mechanical door mechanism 24 may actuate the door 17 between the closed and open positions and/or the door mechanism 24 may lock and unlock the door 17 such that when the door is unlocked a user may access the compartment 14 aligned with the aperture 12 and door 17. The mechanical door mechanism 24 only allows the user access to the contents of the container 14a, 14b at a pre-determined time interval or as a reward when the user reaches an activity level. The mechanical door mechanism 24 is controlled by the control module 26 to open and close or lock and unlock the door 17 so that the user only has access to the contents of the compartments at the correct time.

The housing 10a, 10b may be connected to a mobile communication device 34, for example the user's smartphone. A communication module 28 within the housing 10a, 10b may wirelessly connect to the mobile communication device 34 such that a user may control the housing 10a, via their mobile communication device 34. The communication module 28 may connect wirelessly to the mobile communication device via, for example, Bluetooth® or Wi-Fi.

Furthermore, the mobile communication device 34 may comprise or be connected to an activity tracker 36. The activity tracker 36 is a device for monitoring the movement and activity of the user. For example, the activity tracker 36 may be a smart watch worn by the user or may be an activity tracker integrated with the mobile communication device 34. The activity tracker 36 may monitor the user's activity levels over a period of time on a given day and send the activity data to the control module 26 within the housing 10. The control module 26 may compare the received activity data indicative of the user's activity level with a threshold activity level. If the user's activity level exceeds a threshold or target activity level the control module 26 may activate the mechanical door mechanism 24 to unlock or open the door 17. This is beneficial as the user may be granted access to the snacks within the housing 10a, 10b as a reward for exercising or being active that day.

Figure 4:
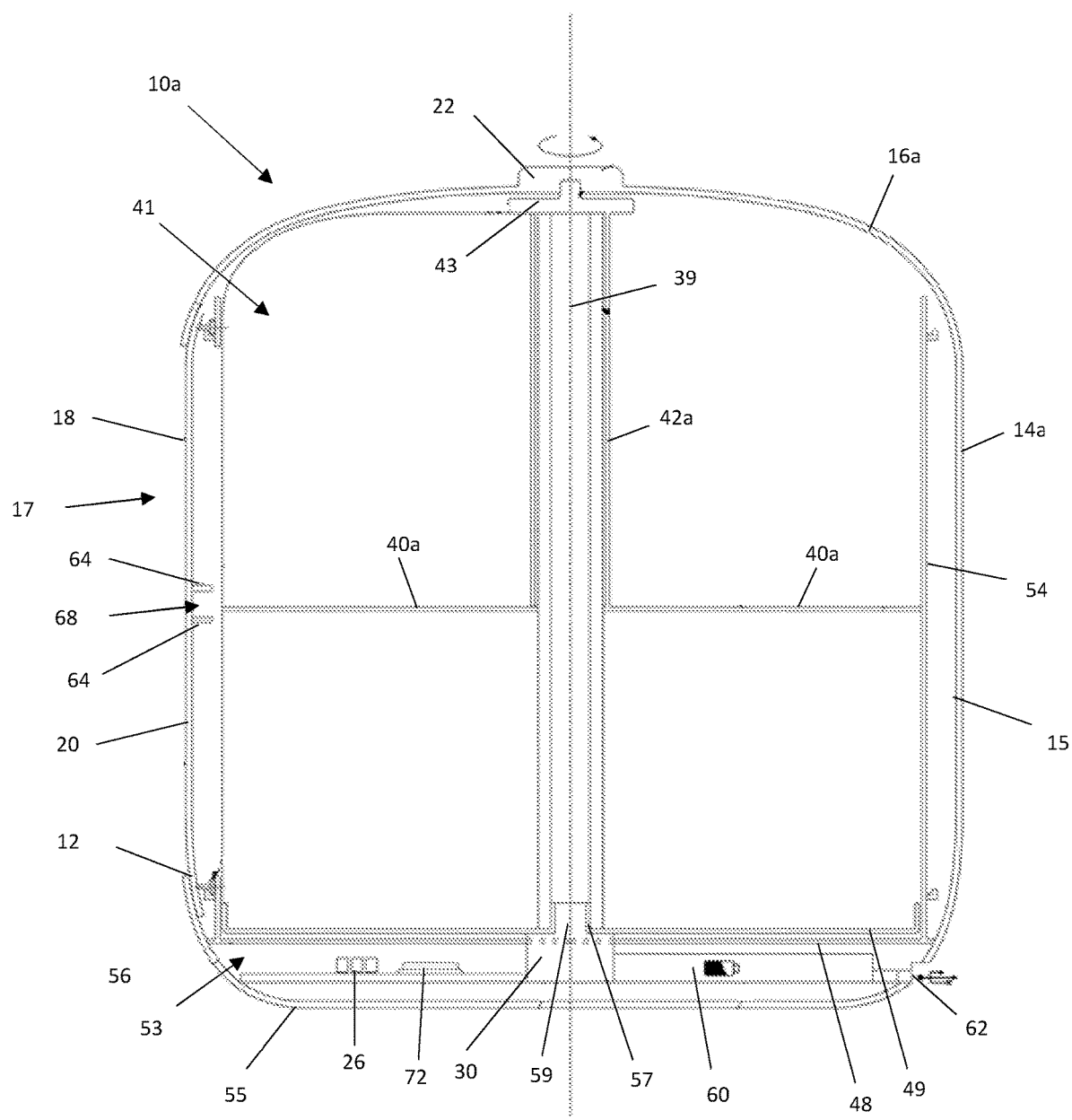
FIG. 4 is a cross-sectional side view of the housing of FIG. 1.

Referring now to FIG. 4, a cross-sectional side view of the housing 10a is shown. The container 14 comprises a circular base plate 48 that spans the internal cavity of the container 14 so as to form a floor within the container 14. The base plate 48 is positioned approximately 10 mm to 30 mm from the base 55 of the container 14 such that a cavity 53 is defined between the underside of the base plate 48 and the base 55 of the container 14. The cavity 53 compartment beneficially may house components such as the control module 26, rotation mechanism 30, communication module 28 (not shown in FIG. 4) and power source 60.

The base plate 48 comprises a central aperture 57 through which a drive spindle 59 may protrude. The drive spindle 59 is coupled to the support member 39 such that rotating the drive spindle 59 in turn rotates the support member 39 and dividing walls 44. As shown in FIG. 4 the support member 39 extends substantially the full height of the container 14. The support member 39 may be an elongate tube and the dividing walls may be integrally formed with or extend from the support member 39. The dividing walls 44 are dimensioned such that they extend substantially the full height of the container 14, from the base plate 48 to the lid 16. Furthermore, the dividing walls extend 44 radially outwardly from the support member 39 to the inner surface of the side wall 15.

When a compartment 41 is positioned so as to line up with the door 17 on the container 14 the dividing walls 44 beneficially prevent a user from reaching between compartments 41 and gaining access to an adjacent compartment 41. As such, the dividing walls 44 ensure the user does not succumb to cravings and try to retrieve snacks from an adjacent compartment 41 when they are granted access to the container 14 via the door 17.

The top of or cap 43a of the support element 39 is at least partially received within retention formation 22 on the lid 16. The retention formation 22 may be a hole, slot or recess on the lid 16 for accommodating the cap 43a of the support element 39. This is beneficial as the retention formation 22 may provide support to the support member 39 to prevent unwanted lateral movement of the support member 39.

Figure 12:
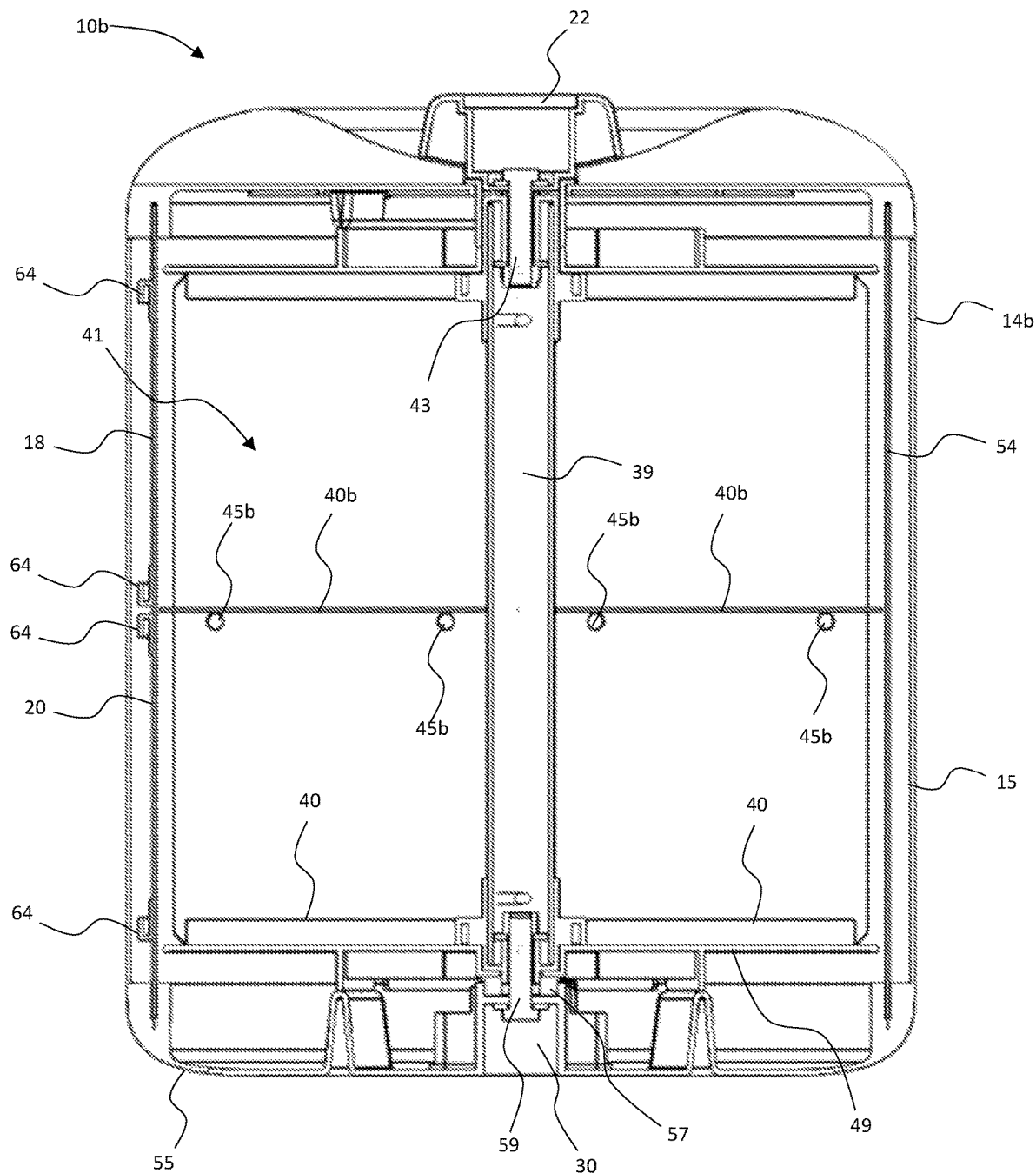
FIG. 12 is a cross sectional view of the embodiment of FIG. 11.
Figure 13:
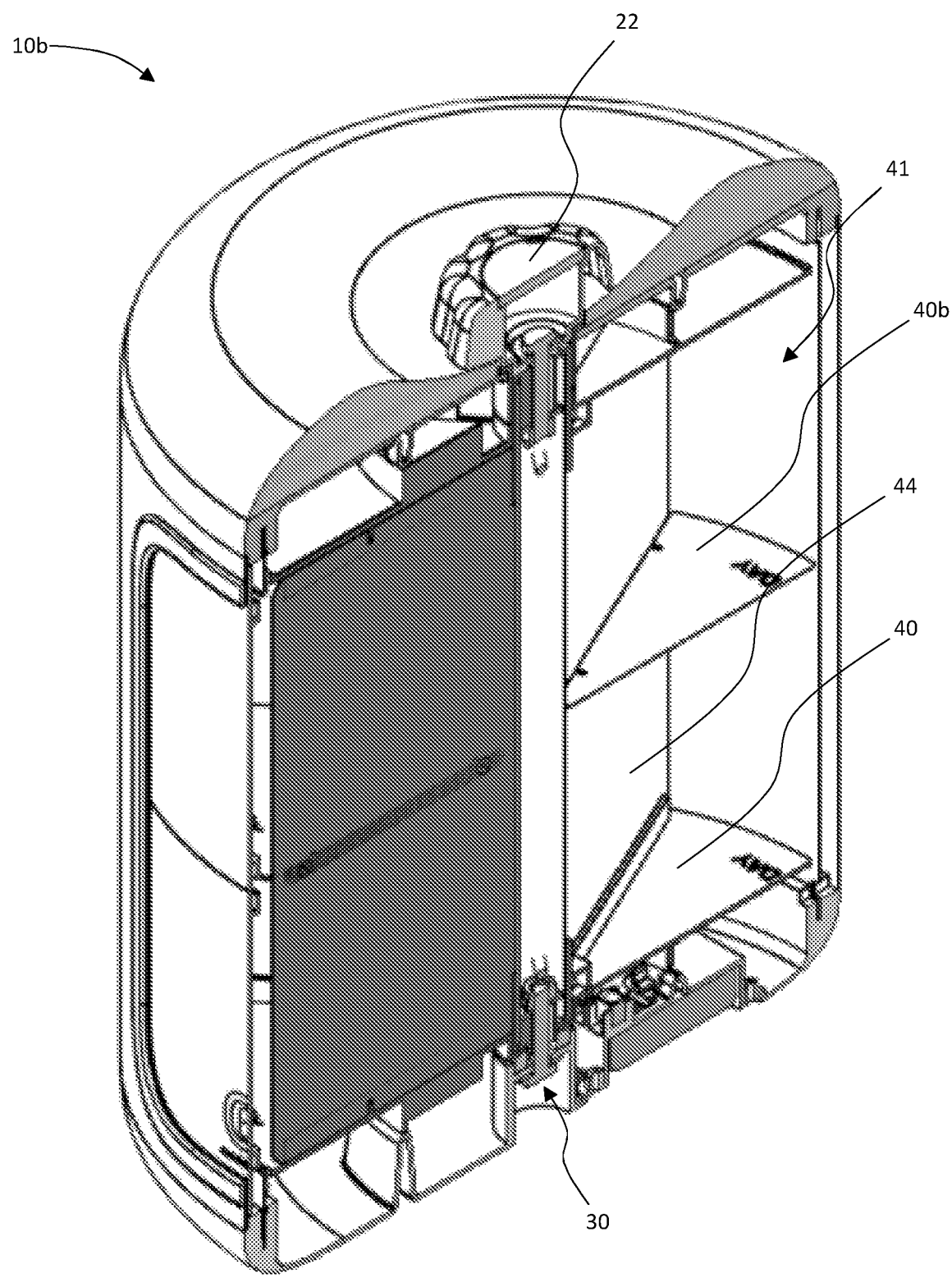
FIG. 13 is an alternative cross sectional view of the embodiment of FIG. 11.

As shown in FIG. 4 and FIG. 12 the container 14a, 14b comprises a shelf 40 extending radially outwardly towards the side wall 15 of the container 14a, 14b. Container 14a has an outer support sleeve 42a which is positioned over the support element 39 such that the support element 39 is at least partially received within the outer support sleeve 42a. The shelf 40 that is present in containers 14a and 14b is positioned approximately halfway up the support member 39 so as to divide each compartment 41 into a lower and upper portion. This is beneficial as it allows a user to store two snacks within each compartment 41. For example, a user may position a snack for the morning on the lower portion and a snack for the afternoon on the upper portion. Alternatively, the user may position a snack for the morning on the upper portion and a snack for the afternoon on the lower portion.

The container 14a, 14b may further comprise a tray or lower shelf 49 attached to and extending radially outwardly from the support element 39 towards the side wall 15 of the container 14a, 14b. In use, the lower shelf 49 is positioned above the base plate 48 such that there is a gap of between about 1 mm and 5 mm between the base plate 48 and the lower shelf 49. The lower shelf 49 beneficially provides a rotating surface in the lower portion of each compartment 41 on which snacks can be placed. This is beneficial as it provides the user with a surface on which to place snacks in the lower portion of the compartment 41 that rotates with the dividing walls 44 and thus compartments 41. Preferable, there is a seal provided below lower shelf 49 but above The shelf 40a in housing 10a is a disc dimensioned to substantially span the internal cavity of the container 14a. The outer support sleeve 42a extends upwardly from the centre of the shelf 40a. The outer support sleeve 42a may be a hollow tube configured to be slid over the top of the support element 39 such that an upper portion of the support element 39 may be accommodated within the outer support sleeve 42a. The outer support sleeve 42a comprises a cap 43a that extends over the top of the outer support sleeve 42a. When the outer support sleeve 42a is slid over the support member 39 the top of the support member 39 abuts the cap 43a such that the shelf 40a is suspended in position within the container 14a.

The shelf 40b in housing 10b comprises a plurality of component sections. In container 10a, there are 7 sections to correspond to the 7 compartments. Each section of shelf 40b is supported by rest 45b such that the shelf 40a is suspended in position within the container 14a. Each section of shelf 40b may be removed from container 14b independently from any of the other sections. This allows for ease of loading container 14b, and for a user to customise the compartments so that some compartments 41 are divided into a lower and upper portion and other compartments 41 are not.

Figure 5:
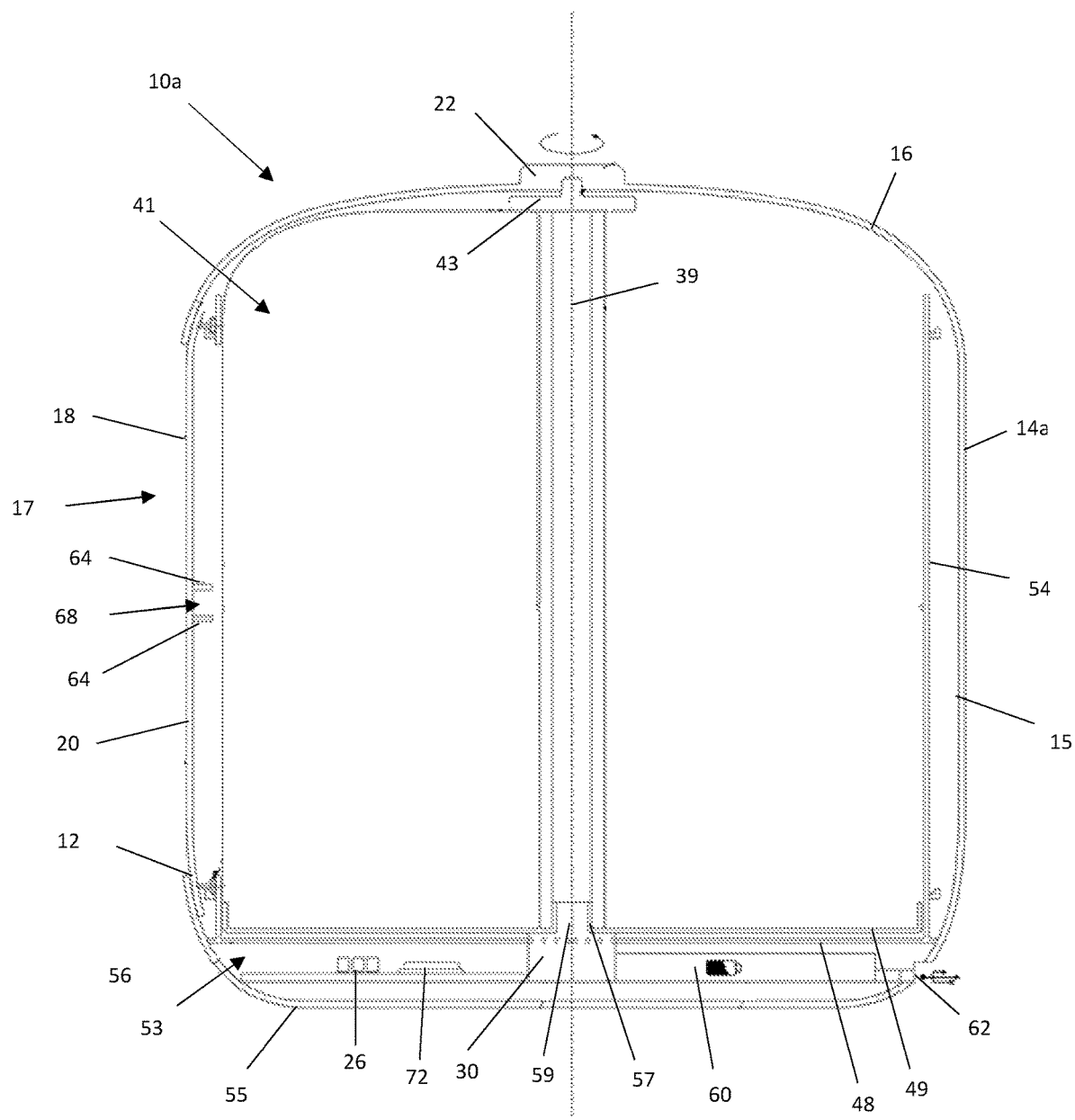
FIG. 5 is a cross-sectional side view of the housing of FIG. 1 with the shelf removed.

Referring now to FIG. 5, a cross-sectional side view of the housing 10a is shown with the removable shelf 40 and outer support sleeve 42a removed. Removing the shelf 40a beneficially creates one large compartment 41 corresponding to each day of the week giving the user the option to store larger snacks within each compartment 41 of the container 14.

Figure 6:
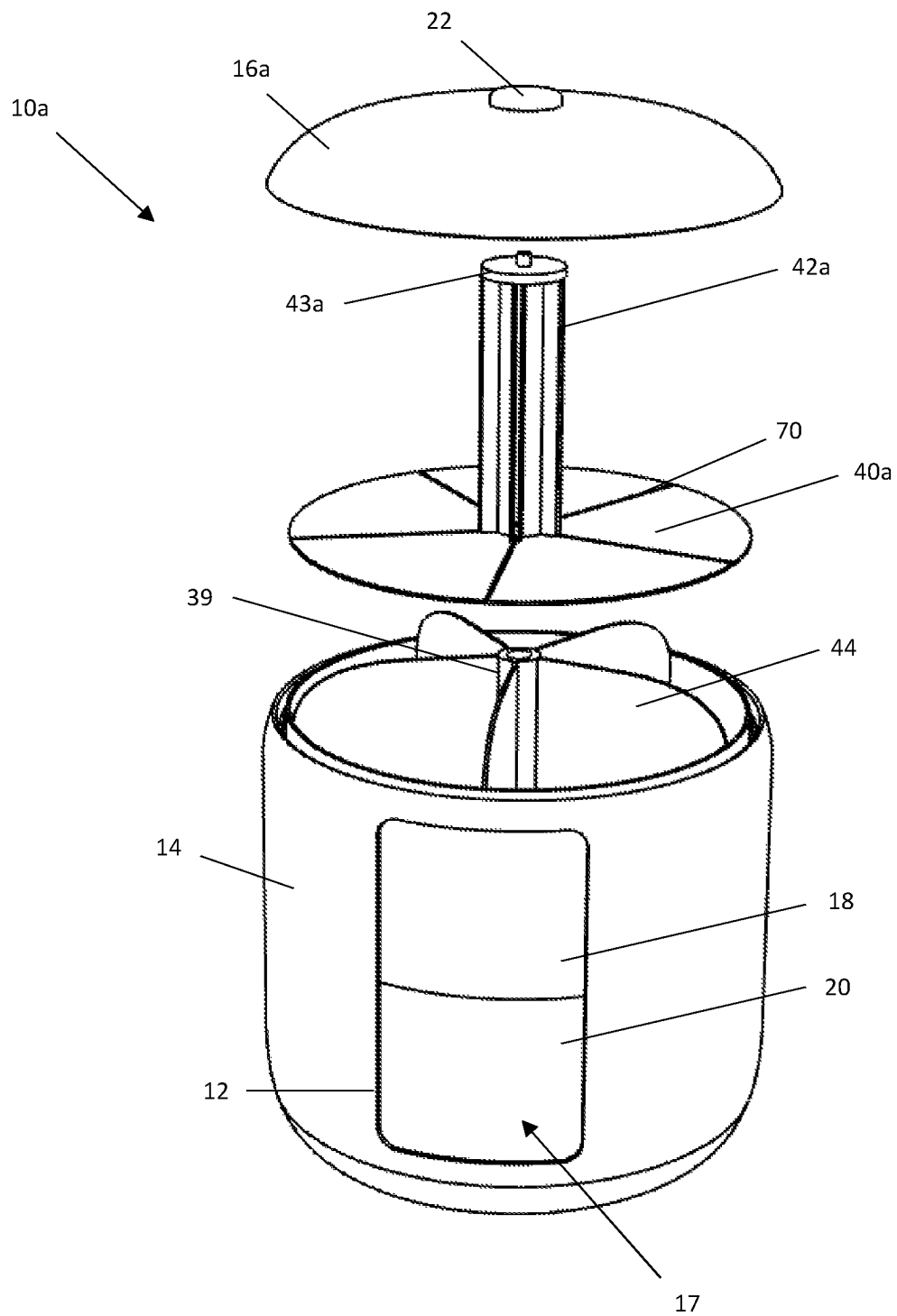
FIG. 6 is an exploded perspective view of the housing of FIG. 1.

FIG. 6 shows an exploded perspective view of the housing 10a with the lid 16a and shelf 40a removed. As best viewed in FIG. 6 the shelf 40a comprises an array of slots 70 extending radially outwardly from the support sleeve 42a toward the edge of the shelf 40. The slots 70 are configured to accommodate each dividing wall 44 within the housing 10a such that the shelf 40 may be easily removed from and attached to the support element 39. This is beneficial as it allows a user to selectively split each compartment 41 into a lower and upper portion. Furthermore, the slots 70 beneficially located the shelf 40 relative to the dividing walls 44 such that when the dividing walls 44 are rotated the shelf 40 is also rotated.

The shelf 40a may be easily removed from within the container by lifting the shelf upwardly such that the outer support sleeve 42a is slid off the support member 39. This is beneficial as it allows a user to easily position snacks on the base shelf 49 within the housing 10a before positioning the shelf 40 within the housing 10a and subsequently positioning snacks on the shelf 40 within each compartment 41. The lid 16a may then be locked to the container 14 such that access to the compartments 41 may be provided by the door 17 only.

It will be appreciated that in embodiments that do not have a removeable lid, such as container 10b, loading is done through the doors 17 only.

Figure 7:
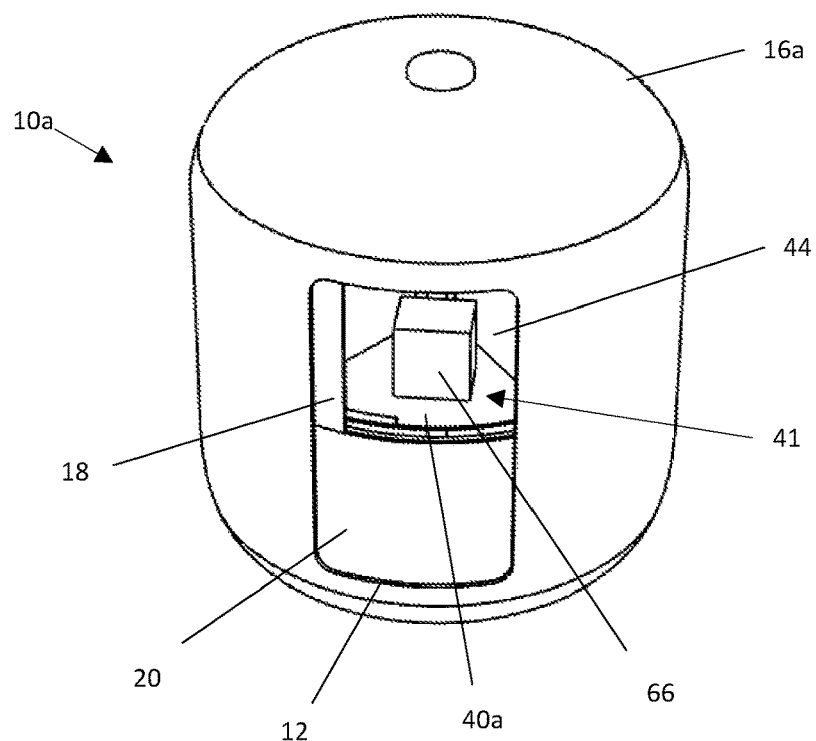
FIG. 7 is a perspective view of the housing of FIG. 1 with an upper door of the housing in an open position.

Referring now to FIG. 7 there is shown a perspective view of the housing 10a with the upper door 18 in an open position and the lower door 20 in a closed position. When the upper door 18 is in the open position a user may gain access to a snack 66 positioned on the shelf 40, and thus in the upper portion of the compartment 41. However, the shelf 40, compartment walls 44 and lower door 20 prevent access to the lower portion of the compartment 41 or to any adjacent compartments within the housing 10a. Housing 10b works in the same manner.

Figure 8:
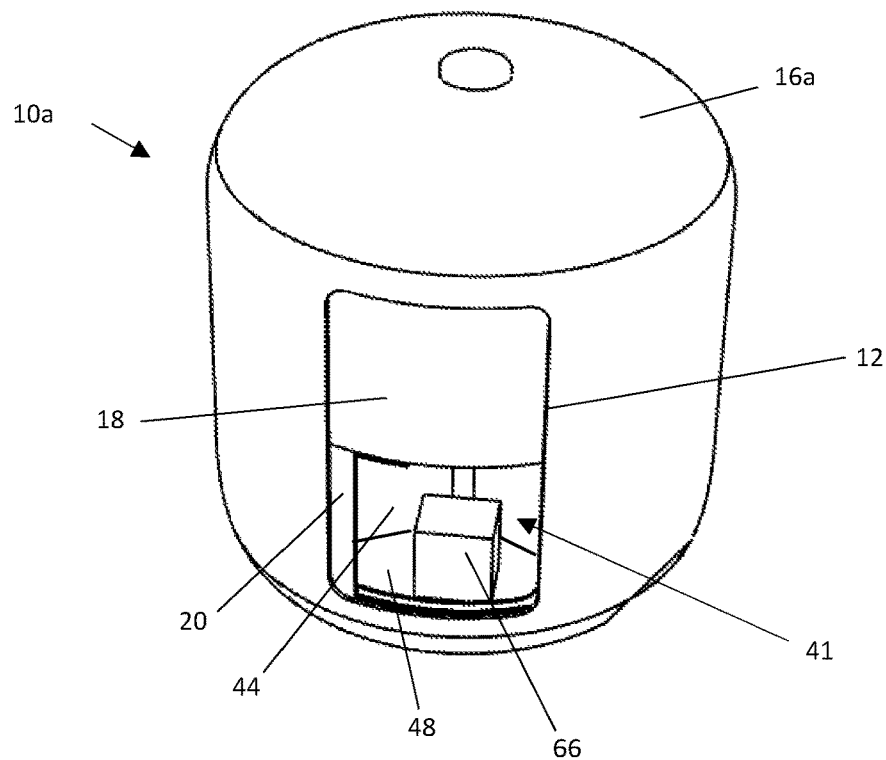
FIG. 8 is a perspective view of the housing of FIG. 1 with a lower door of the housing in an open position.

FIG. 8 similarly shows a perspective view of the housing 10a with the lower door 20 in an open position and the upper door 18 in a closed position. When the lower door 20 is in the open position a user may access a snack located on the base shelf 49 and thus in the lower portion of the compartment 41. Again, when the lower door 20 is in the open position the shelf 40, compartment walls 44 and upper door 18 prevent access to the upper portion of the compartment 41 or to any adjacent compartments within the housing 10. Housing 10b works in the same manner.

Returning now to FIG. 4, the lower and upper doors 20, 18 comprise inwardly protruding lips 64. The lip 64 on the lower door 20 is positioned between 1 mm and 5 mm from the top edge of the lower door 20. Similarly, the lip 64 on the upper door 18 is positioned between 1 mm and 5 mm from the bottom edge of the upper door 18. A gap 68 is defined between the two radially inwardly extending lips 64. The gap 68 may be configured to receive a portion of the outer edge of the shelf 40 when the doors are in the closed position. When either the lower door 20 or upper door 18 are opened the lip on the door that is in the closed position serves to inhibit access to the compartment aligned with the closed door. The lip 64 may further act as a rail to support the opening and closing of the lower and upper doors 20, 18. For example, the lower and upper doors 18 may be mounted on the lips 64 such that the lower and upper doors 20, 18 can slide along the lips 64. Housing 10b works in the same manner.

The container 14a, 14b may further comprise an inner wall 54 positioned on the inside of the outer side wall 15 of container 14. The inner wall 54 is positioned such that the shelf 40 extends out towards it creating a close fit to reduce air flow, allowing the user to place perishable snacks inside the compartment 41. The inner wall 54 is positioned between about 5 mm and 30 mm from the outer side wall 15 of the container 14 creating a cavity between the inner wall 54 and the outer side wall 15 which can accommodate the mechanical door mechanism 24 and the locking mechanism 32. The inner wall 54 beneficially acts as a barrier between snacks contained within the container and the door and locking mechanisms 24, 32, The container 14 may comprise of a speaker 72 positioned in the cavity 53 between the base 55 and the base plate 48. The speaker 72 may be operated by the control module 26 to give a notification to the user. a notification via the speaker 72 may, for example, be in the form of motivational quotes or audible instructions instructing or reminding the user of their fitness goals to stop the user from attempting to access snacks within the container 14. The audible instructions provided to the user may make the user accountable for their actions in a bit to prevent the user succumbing to cravings and binging on the snacks within the container 14. The speaker 72 may also act as an alarm to alert or serve to reward the user when one of the doors 18, 20 has opened as a result of achieving their activity level goal. The speaker 72 may also further act as a low battery warning to prompt the user to charge up the housing 10, or a warning that the housing 10 has not been locked properly, or to prompt the user to be more active in order to reach the threshold activity level. Housing 10a, 10b is preferably rechargeable, most preferably by a USB charger, but it will be appreciated that single use batteries could be used.

In some embodiments a refrigeration module may be included in the cavity 53 beneath the base plate 48. For example, a Peltier device or the like may act to cool the base plate 48 in order to refrigerate the contents of the container 14. This is particularly beneficial in warmer climates where snacks within the housing 10 may melt or where the user wishes to store beverages within the housing 10 which the user wishes to consume chilled. The Peltier device may contact the base plate 48 so as to cool the base plate and thus the contents of the container 14. The base plate may be metallic in order to improve thermal conductivity and the side walls 15 and lid 16 may be a plastics material to improve insulation. For example, the side walls 15 and lid 16 may be double walled to insulate the contents of the container 14.

FIG. 9 shows a flow chart outlining a method of controllably releasing a snack 66 from the housing 10a, 10b. In Step 101 the user positions snacks in the compartments 41 within the container 14. Positioning the snacks within the container 14a may comprise firstly removing the lid 16a from the container 14 before positioning the snacks 66 that the user wishes to consume over the course of a week within the container 14a. Positioning the snacks within the container 14b may comprise firstly opening the door 17 before positioning the snacks 66 that the user wishes to consume over the course of a week within the container 14b. For example, on a Monday morning a user may position a snack in each of the five compartments 41 within the container 14a, 14b. The snacks that the user positions in each compartment 41 corresponds to the snacks that the user wishes to consume on a given day thereby allowing the user to plan out portions for the week ahead at the start of the week.

Positioning the snacks 66 within the container 14 may further comprise placing a shelf 40, or component sections of shelf 40 within the container 14 after snacks 66 have been positioned within the respective compartments 41. Placing the shelf 40a within the container 14a may comprise sliding an outer support sleeve 42a over a support element 39. The support element 39 may be at least partially received within the outer support sleeve 42a and the outer support sleeve 42a may rest on or abut the top of the support element 39 such that the shelf 40 is suspended within the container 14a. Placing the shelf 40b within the container 14b may comprise placing the component sections of shelf 40b onto their respective rests 45b. A user may then position further snacks 66 on the shelf 40a, 40b between the respective dividing walls 44.

The shelf 40a, 40b may be used to split each compartment 41 into a lower and upper portion which may be representative of a snack to be consumed in the morning and afternoon respectively.

In Step 102 the lid 16a is placed onto the container 14a and locked into place using the locking mechanism 32, preventing the user from gaining access to the contents of the housing 10. The lid 16a may be positioned on the container 14a by the user and subsequently locked to the container 14a by operating the user's mobile communication device 34. The user may use the mobile communication device 34 to selectively lock and unlock the lid 16a.

In Step 103 the monitored measurable parameter is the user's activity level. Monitoring the user's activity level may comprise tracking the number of steps the user has taken over a given period of time using the activity tracker 36. For example, the activity tracker 36 may monitor the number of steps the user has taken over the course of a morning or an entire day.

In Step 104 the user's activity level is compared with a threshold value. The threshold value may be a target number of steps that the user must achieve before they are able to gain access to a snack 66 contained within a container 41.

In Step 105 if it is determined that the user's activity level has reached the target or threshold value then the control module 26 may grant access to a snack 66 within the container 14 by opening or unlocking at least one of the lower and upper doors 20, 18. For example, if it is determined that the user has taken 5,000 steps by 11:00 then the lower door 20 may open so as to allow the user to access the snack 66 contained within the lower portion of the compartment 41 associated with that day.

If the user continues to be active over the course of the afternoon the user's activity levels may reach a threshold activity level value for the afternoon. For example, if the user has taken 8,000 steps by 15:00. In this scenario the upper door 18 may be unlocked or opened so as to grant the user access to the snack contained within the upper portion of the compartment 41. Upon determining that a target threshold value has been met a notification may be sent to the user's mobile communication device 34 so as to alert them to the fact they have met the target threshold activity level and are subsequently being rewarded with the snack 66.

Determining when the user has met the threshold activity level may comprise comparing the user's activity level with both the threshold activity value and the time of day. This is beneficial as the user may wish to consume the snacks 66 between substantial meals. For example, the user may wish to consume a snack at 11:00 and 15:00 and thus the user's activity level may be compared with the target activity levels at or within a time window of these snacking times. This is beneficial as it ensures the user does not gain access to the snacks shortly after consuming a main meal. For example, if a user were to walk to work in the morning they may have reached the target activity level at the start of the day but it would be undesirable to provide the user with the snack at the very start of the working day as their cravings will likely peak later in the morning.

It will be appreciated that where more than one measurable parameter of the user is monitored, then the criteria for determining whether a product should be released to the user by unlocking the door 17 can be programmed to be dependent on all of the monitored measurable parameters meeting their respective threshold values, and/or at least one of the monitored measurable parameters meeting their respective threshold values and/or some but not all of the monitored measurable parameters meeting their respective threshold values. So for example, a user can choose to be given access to a product when they reach, for example, their step goal and their snacking time window, or their step goal only, or their time window only. It will be appreciated that the user can customise their own unlock requirements in order to match their personalised their health and fitness goals.

FIG. 10 shows a flow chart outlining an additional method of controllably releasing a snack 66 from the housing 10. In Step 110 the user positions snacks in the compartments 41 within the container 14 as described above. In Step 111 the lid 16a is placed onto the container 14 and locked into place using the locking mechanism 32, preventing the user from gaining access to the contents of the housing 10. The lid 16a may be positioned on the container 14 by the user and subsequently locked to the container 14 by operating the user's mobile communication device 34. The user may use the mobile communication device 34 to selectively lock and unlock the lid 16a, or the door 17 of a container without a removable lid.

In Step 112 the user may input pre-set target opening times into the communication device 34 to control the exact time when the housing 10 will open giving the user access to the contents of the housing 10. Monitoring the time of day may comprise using the clock function within the communication device 34.

In Step 113, the time of day is compared with a pre-set time of day. In Step 114, if it is determined that the time of day has reached the target time of day, the housing 10 will unlock and open one of, or, both of its doors 18, 20 giving the user access to a snack 66 contained within a compartment 41. For example, if it is determined that the time is 11:00 and the pre-set time to open the lower door 20 is also 11:00, the lower door 20 may open so as to allow the user to access the snack 66 contained within the lower portion of the compartment 41 associated with that day.

Once the time reaches the second pre-set time for that day, the door 18, 20 giving access to the portion of the container 41 that still contains a snack for that day will open. For example, if the user has pre-set the time of 15:00 to open the upper door 18 and the time reaches that pre-set threshold time of 15:00, the upper door 18 may open so as to allow the user to access the snack 66 contained within the upper portion of the compartment 41 associated with that day. Upon determining that the target opening time has been met a notification may be sent to the user's mobile communication device 34 so as to alert them to the fact that the lower and/or upper door 20, 18 has been unlocked or opened and are subsequently being rewarded with the snack 66.

FIG. 17 shows an interface that a user could use to input their desired thresholds for being able to access products from within the container. In FIG. 17, the user has selected that in order to unlock their first product, they need to have two monitored measurable parameters meeting their respective threshold values. In this example, the first monitored measurable parameter is a step count, and it's threshold value is 5,000 steps. The second monitored measurable parameter is time, and it's threshold value is 11:00. The door with therefore only be unlocked when it is past 11:00 am and the user has completed at least 5000 steps. The user has chosen to only have to meet one monitored measurable parameter in order to access their second product of the day. The monitored measurable parameter is a step count, and it's threshold value is 10,000 steps.

At the end of the day the rotation mechanism 30 may rotate, or allow rotation of, the dividing walls 44 within the container to align the compartment 41 containing snacks 66 for the following day with the door 17.

The method may be repeated over the course of the week or until all of the snacks 66 have been consumed. The control module 26 will then unlock the lid 16a, or the door 17 of a container without a removable lid at midnight on the final day so as to allow the user access to the container 14 so they can replenish the snacks 66 stored within the container 14 for the following week.

Figures 15, 16:
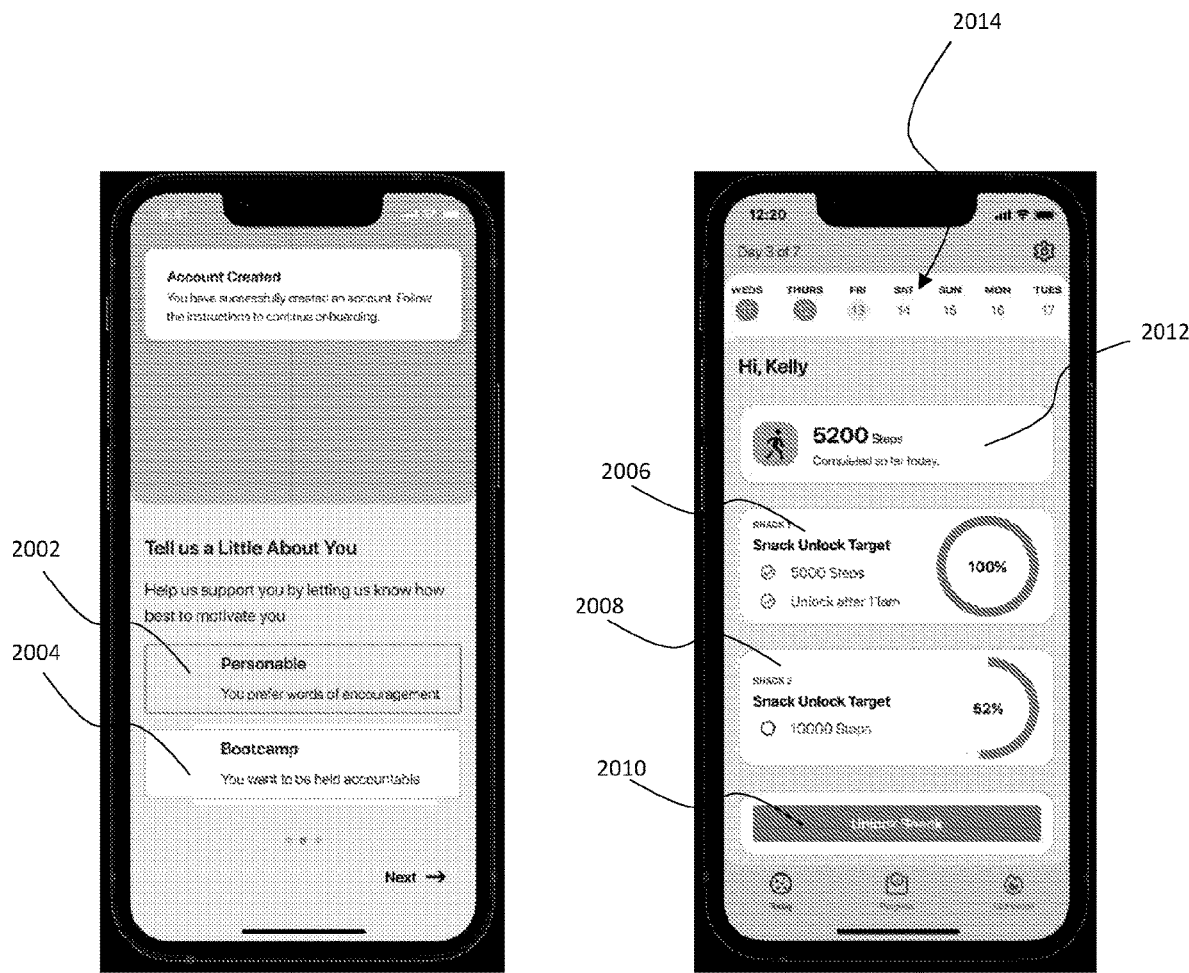

The speaker 72 provides a further benefit of allowing the housing 10 to communicate with the user. The communication from speaker 72 is one type of notification that the housing or mobile communication device may provide. An alternative type of notification would be to provide an audible notification via a speaker of the mobile communication device, or to provide a visual notification on a screen of the mobile communication device. The notification can be provided when the user is are attempting to access the contents of the container 14, either through the lid 16a(when present) or door 17, before the user has met the threshold activity level. The notification provided to the user may be selected from a motivational message reminding them of their goals, or an "unpleasant" message of some kind, for example, a loud klaxon sound The user can choose which category of notifications they want to receive, and when they want to receive them via a user app. During a set-up stage, the user may choose the nature of the notifications that they wish to receive. In FIG. 15, the user is provided with a choice between a "personable" mode 2002 and a bootcamp mode 2004. Once a user has set-up their targets, they are provided with a summary as shown in FIG. 16. The user then sees a summary similar to that shown in FIG. 16, showing the day of the week 2014, their days step count to date 2012, their first 2006 and second 2008 targets, and an unlock option 2010.

The notification (communication) may be in the form of motivational quotes or instructions to motivate the user and to hold the user accountable for their actions thereby encouraging them to complete the required activity level threshold in order to access the snacks within the container 14. Optionally, the user can request a motivational notification on demand if they are lacking in motivation and want to be reminded of their goals.

Alternatively, the notification may be provided when the lid(when present) and door are locked, and when the user has not yet attempted to access the products in the container.

This pre-emptive notification, which is preferably a motivational notification may help a user to keep up their motivation levels before they succumb to feeling desperate for a snack. Providing a user with a prompt to, say, drink a glass of water, or eat a healthy snack that is not in the container, before they become overly hungry, may prevent the user from making a poor snacking decision. Alternatively or additionally, a motivational notification asking them to remember their goals, may be enough of a deterrent to the user to prevent them succumbing to accessing the product at that time. The time that these pre-emptive notifications are sent to a user may be determined by user information provided by the user to a user app during a set-up stage or new user onboarding. The user may be asked to provide information such as their wake times, meal times, exercise times, the reason they purchased the product, what triggers cravings for them, and times they are aware they have cravings for snacks.

Figure 14:
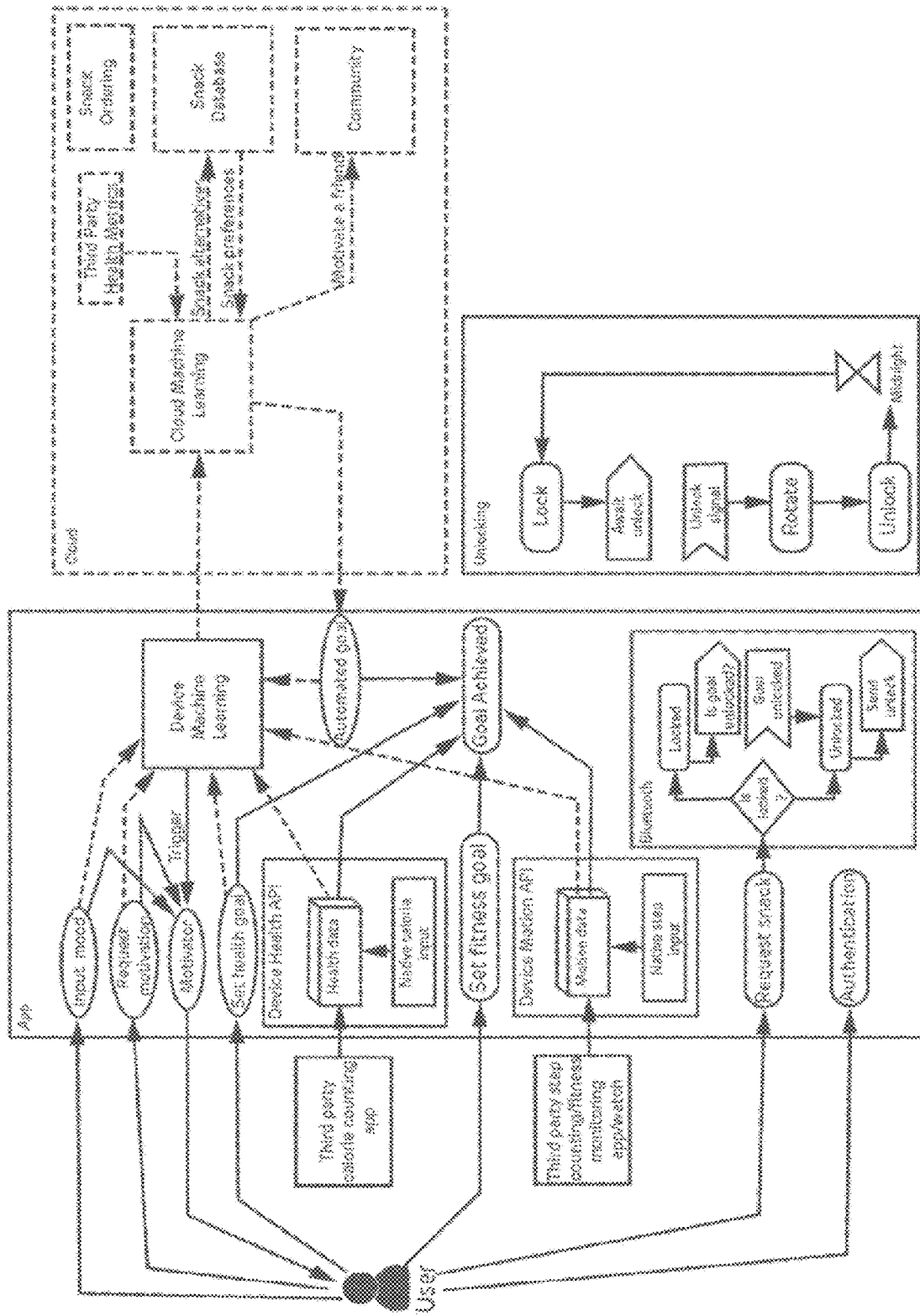
FIG. 14 is a flow chart of a method according to the present invention.

The time that these pre-emptive notifications are sent to a user may be additionally or alternatively be determined by user information provided by the user directly or indirectly during use of the container and the software. This further data can be used via machine learning to gradually improve the timing and nature of the pre-emptive notifications that are sent to the user. An example of data that the user directly provides during use can include providing an indication 2006 of their current mood, as shown in FIG. 18 in response to a request from the software. Examples of data that the user indirectly provides may include the timing of their unlock requests, the frequency that the user requests additional motivation notifications, any overrides that the user requests to the lock status of the container. FIG. 14 shows a flow chart describing a detailed method according to the present invention.

It will be appreciated that the software may have additional features integrated into it and/or may share data with other apps or software. These may include providing or integrating with a platform that may provide advanced features with cloud-based machine learning, a virtual community, integration with a snack encyclopaedia and integration with a method of ordering snacks.

Although particular embodiments of the disclosure have been disclosed herein in detail, this has been done by way of example and for the purposes of illustration only. The aforementioned embodiments are not intended to be limiting with respect to the scope of the housing for controllably releasing a product.

It is contemplated by the inventors that various substitutions, alterations, and modifications may be made to the invention without departing from the scope of the invention as defined by the housing for controllably releasing a product. Examples of these include the following: A refrigerated housing for controllably releasing a product.

The invention claimed is:

1. A method of controllably releasing a product to a user from a housing, the housing comprising; at least one compartment, and an access opening for accessing the compartment, the access opening having a locked state and an unlocked state, and the method comprising:
    locking the access opening to the housing to prevent access to the product;
    monitoring a measurable parameter, and comparing the measurable parameter with a threshold value;
    determining whether to unlock the access opening by determining whether the monitored measurable parameter meets the threshold value; and either
    (a) in response to determining that the access opening should be unlocked, unlocking the access opening allowing the user to access the product located within the compartment; or
    (b) in response to determining that the access opening should not be unlocked, keeping the access opening locked, continuing to prevent the user from accessing the product located within the compartment;
    providing software for use on a mobile communication device, the software being configured to communicate with the housing, and/or software in the housing itself;

providing user information by the user to the software in a set-up step; and using the user information by the software to predict a habit of the user, preferably by machine learning.

2. A method as claimed in claim 1, wherein the measurable parameter is one of: time; or a monitored activity level of a user, preferably a step count of a user; or an input from the user confirming that they have completed an activity; or a calorie count of a user.

3. A method as claimed in claim 1, wherein more than one measurable parameter is measured and compared to a threshold value.

4. A Method as claimed in claim 3, wherein the step of determining whether to unlock the access opening further comprises determining whether each monitored measurable parameter meets their respective threshold value, and determining that the access opening should be unlocked if and only if each monitored measurable parameter meets their respective threshold value.

5. A Method as claimed in claim 3, wherein the step of determining whether to unlock the access opening further comprises determining whether some, but not all, of the monitored measurable parameters meet their respective threshold value, and determining that the access opening should be unlocked if a predetermined combination of monitored measurable parameters meet their respective threshold value.

6. A Method as claimed in claim 1, the method further comprising outputting a notification to the user in response to the user attempting to gain access to the product when the access opening is in its locked state, to deter the user.

7. A Method as claimed in claim 1, the method further comprising the software gathering additional user information via the user's interactions with the housing and/or with the mobile communication device.

8. A method as claimed in claim 1, the method comprising outputting a notification to the user at a notification time when the housing is in its locked state, to deter the user, the notification preferably being either an audio command output from a speaker to the user, or a notification provided on the mobile communication device.

9. A method as claimed in claim 8, the method comprising determining what time to send a notification and/or what type of notification to send by using the prediction of the user's habits and/or by using the user information provided by the user.

10. A method as claimed in claim 8, comprising a sub step in which at least one threshold value may be adjusted in response to the prediction of the user's habits and/or by using the user information provided by the user.

11. A method as claimed in claim 10, wherein the user is given the choice to adjust one of more of the threshold values, and if the user chooses to adjust the threshold value, the user experiences a pre-set penalty.

12. A method as claimed in claim 1, wherein providing access to the product comprises rotating the compartment within the container to align the compartment with the access opening.

13. A method according to claim 1, wherein the product is one or more of: any single use and/or consumable item, including but not limited to: a snack; a pharmaceutical; a drink, including an alcoholic drink; a product related to vaping and/or smoking.

14. A system for storing and controllably releasing a product to a user, the system comprising:
a housing including:
a container comprising a compartment within the container wherein the product is positioned within the compartment;
wherein the container further comprises an access opening on a side wall of the container and a door is positioned over the access opening, the door being moveable between a closed position in which the door prevents access to the container and an open position in which the user may access the product contained within the container;
a device for monitoring one or more measurable parameters of the user;
a control module configured to compare the or each measurable parameter with a respective threshold value; the control module being further configured to unlock the door of the housing to give the user access to the product within the container in response to the control module determining that the, or each, or a predetermined combination of measurable parameter(s) of the user meet their respective thresholds; and
software for use on a mobile communication device, the software being configured to communicate with the housing, and/or software in the housing itself, the software being further configured to receive user information from the user in a set-up step and to use the user information to predict a habit of the user, preferably by machine learning.

15. A system as claimed in claim 14, wherein the container comprises a plurality of dividing walls and wherein a plurality of compartments for storing the products are defined between adjacent dividing walls.

16. A system as claimed in claim 15, wherein the dividing walls are coupled to and extend radially from a support member towards an internal surface of the container.

17. A system as claimed in claim 16, wherein the support member is mounted on a rotation mechanism for rotating the support member and wherein rotating the support member rotates the dividing walls to control the position of the compartments within the container.

18. A system as claimed in claim 16, wherein the support member is an elongate shaft extending upwardly from a centre point on a base of the container.

19. A system as claimed in claim 16, wherein each of the dividing walls are spaced evenly around the support member such that the compartments defined between adjacent dividing walls are substantially equal size.

20. A system as claimed in claim 15, wherein a shelf is positioned within the cavity such that each compartment comprises a lower portion located under the shelf and an upper portion located above the shelf.

21. A system as claimed in claim 15, wherein the housing comprises five dividing walls and five compartments defined between the dividing walls or seven dividing walls and seven compartments defined between the dividing walls.

22. A system as claimed in claim 14, wherein the housing comprises a speaker configured to output a notification to the user at a notification time.

* * * * *